US009148791B2

(12) United States Patent
Nentwig (10) Patent No.: US 9,148,791 B2
(45) Date of Patent: Sep. 29, 2015

(54) METHOD AND APPARATUS FOR SPECTRUM SENSING (75) Inventor: Markus Nentwig, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 187 days.

(21) Appl. No.: 13/579,308

(22) PCT Filed: Feb. 26, 2010

(86) PCT No.: PCT/FI2010/050152
§ 371 (c)(1),
(2), (4) Date: Aug. 16, 2012

(87) PCT Pub. No.: WO2011/104420
PCT Pub. Date: Sep. 1, 2011

(65) Prior Publication Data
US 2012/0309442 A1 Dec. 6, 2012

(51) Int. Cl.
H04W 72/04 (2009.01)
H04W 16/14 (2009.01)
H04W 48/16 (2009.01)

(52) U.S. Cl.
CPC .............. H04W 16/14 (2013.01); H04W 48/16 (2013.01)

(58) Field of Classification Search
CPC ..... H04W 16/00; H04W 16/04; H04W 16/14; H04W 72/00; H04W 72/02; H04W 72/04; H04L 12/26; H04L 27/2605
USPC ........ 455/422.1, 450, 452.1, 452.2, 453, 455, 455/501, 509, 67.11; 370/278, 328, 329, 370/330
See application file for complete search history.

(56) References Cited

U.S. PATENT DOCUMENTS

2008/0090581 A1* 4/2008 Hu .............................. 455/452.1
2008/0096542 A1* 4/2008 Chu et al. .................... 455/422.1
2008/0261639 A1 10/2008 Sun et al.
2009/0135744 A1* 5/2009 Chaudhri et al. ............. 370/278

FOREIGN PATENT DOCUMENTS

CN    101511092 A    8/2009
WO    2009073303 A1  6/2009
WO    2009115957 A1  9/2009

OTHER PUBLICATIONS

International Search Report of PCT/FI2010/050152, dated Dec. 8, 2010.
Maiady, A.C, et al, "Clustering method for distributed spectrum sensing in cognitive radio systems", Military Communications Conference (MILCOM 2008), pp. 1-5, Nov. 16-19, 2008.
Letaief, K.B. et al: "Cooperative communication for cognitive radio networks", Proceedings of the IEEE, vol. 97, No. 5, pp. 878-893, May 2009.
Chinese Office Action of Application No. 201080064810.3 dated Jun. 30, 2014.

* cited by examiner

Primary Examiner — Thanh Le
(74) Attorney, Agent, or Firm — Banner & Witcoff, Ltd.

(57) ABSTRACT

In a non-limiting and exemplary embodiment, a method is provided for adapting a device set of one or more radio devices providing detection estimates for the presence of a primary radio resource user. A first detection estimate for the presence of the user is determined on the basis of spectrum sensing. At least one other detection estimate for the presence of the user is received from the device set. A detection value is generated on the basis of the first detection estimate and the at least one other detection estimate, and the device set is adapted on the basis of the detection value.

18 Claims, 7 Drawing Sheets

METHOD AND APPARATUS FOR SPECTRUM SENSING

FIELD OF THE INVENTION

The present application relates generally to spectrum sensing in a radio system.

BACKGROUND OF THE INVENTION

Cognitive radio refers to a radio device which can intelligently detect which communication channels are in use by primary users and which are not, and move into vacant channels while avoiding occupied ones.

An important function of cognitive radios is spectrum sensing, generally referring to detecting unused spectrum. Cognitive radios attempt to sense "spectrum holes". A spectrum hole is a frequency range, where the absence of primary users has been determined. Primary users are for example TV stations, wireless microphones or cellular systems. By detecting particular spectrum holes and exploiting them rapidly, cognitive radios can significantly improve spectrum utilization. Detecting the absence of primary users is a difficult task and a single detector may make errors when determining whether the spectrum is primary free or not.

One sensing technique is so-called distributed or co-operative spectrum sensing, where sensing results from more than one secondary device are combined. The combination of sensing results enables better detection probability. In ideal case, a cognitive radio receives detection results from all nearby cognitive radios. In practice, this may be impractical due to large amount of signalling. Thus, there is a need for optimizing the use of resources for co-operative spectrum sensing.

SUMMARY OF THE INVENTION

Various aspects of examples of the invention are set out in the claims.

According to a first embodiment, a method is provided for adapting a device set of one or more radio devices providing detection estimates for the presence of a primary radio resource user, comprising: determining a first detection estimate for the presence of a primary radio resource user on the basis of spectrum sensing, receiving at least one other detection estimate for the presence of the user from a device set, wherein the device set is a set of one or more radio devices, generating a detection value on the basis of the first detection estimate and the at least one other detection estimate, and adapting the device set on the basis of the detection value.

According to a second embodiment, there is provided an apparatus comprising: means for determining a first detection estimate for the presence of a primary radio resource user on the basis of spectrum sensing, means for receiving at least one other detection estimate for the presence of the user from a device set, wherein the device set is a set of one or more radio devices, means for generating a detection value on the basis of the first detection estimate and the at least one other detection estimate, and means for adapting the device set on the basis of the detection value.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE INVENTION

An example embodiment of the present invention and its potential advantages are understood by referring to FIGS. 1 through 11b of the drawings.

Figure 1:
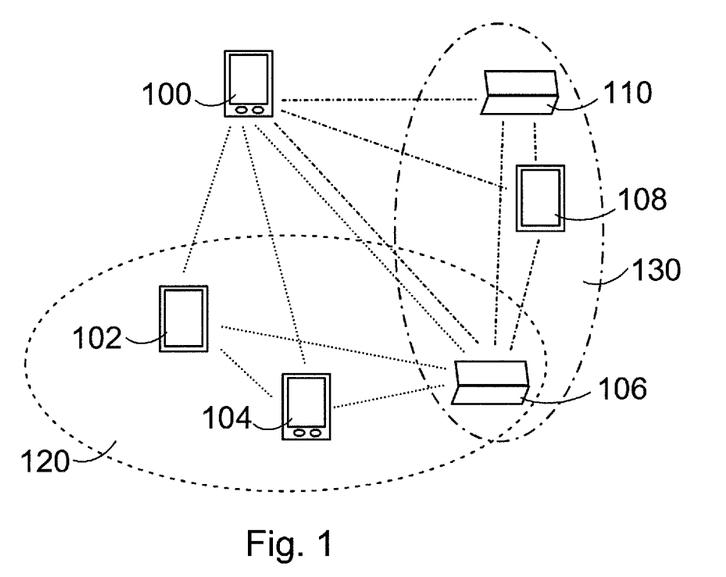
FIG. 1 illustrates cognitive radio devices capable of spectrum sensing.

FIG. 1 illustrates cognitive radio (CR) devices 100 to 110 capable of spectrum sensing. One or more of the radio devices 100 to 110, or a further device, may act as a primary user having a priority for a given radio resource.

The cognitive radios need to be able to detect primary users and avoid causing interference to the primary users. At least some of the CR devices collaborate in spectrum sensing, by sending spectrum sensing information to other nearby cognitive radios. Thus, when a radio device 100 to 110 has made some spectrum sensing, it can provide the detection result to other CR devices, e.g. via broadcast signalling. Then a receiving CR device may combine its own detection result and the received detection results. This combined detection result is used to estimate whether the spectrum is primary user free.

In ideal case, a cognitive radio receives detection results from all nearby cognitive radios. In practice, this may be impractical due to a large amount of signalling. Thus, there is a need to minimize the amount of messages to save power and radio resources and simultaneously receive enough messages to detect primary users with high probability. To reduce the amount of signalling and processing, not all cognitive radio devices 100 to 110 exchange sensing results with each other.

In the example of FIG. 1, at least the radio device 100 is arranged to select a sub-set 120 of radio devices or nodes, the sensing results of which are used for spectrum sensing. Thus, the radio device 100 is arranged to receive and/or process sensing results only of devices belonging to this sub-set 120 to determine primary user free radio resources. The sub-set 120 of the radio devices may be determined for at least the radio device 100 to be used for sensing a given spectrum f at a time T. The sub-set may be updated in response to reception of a sensing result and/or periodically.

As further illustrated in FIG. 1, another sub-set 130 of devices may be determined for the radio device 100. This sub-set 130 may represent the situation at another time, T+t, t representing a predetermined or random time interval, and/or another frequency band $f_2$.

Devices of a sub-set 120, 130 can belong to a same cognitive control network (CCN) or to more than one CCN. If they belong to the same CCN, the sub-set can be a sub-set of the CCN. Although FIG. 1 illustrates also communications between the devices in the device set 120, 130, it is to be noted that in case of distributed or decentralized control each cognitive radio device 100 to 110 may determine its sub-set of devices independently of other devices. Alternatively, in some systems determination of a sub-set may be centralized or semi-centralized, whereby a controller node determines the sub-set(s) for other devices. For instance, one CR device could be more sensitive and can thus detect primary users more easily than other CR devices. Such detection information would then be particularly useful for other CR devices, and such more sensitive CR device could also inform other CR devices of its presence.

Figure 2:
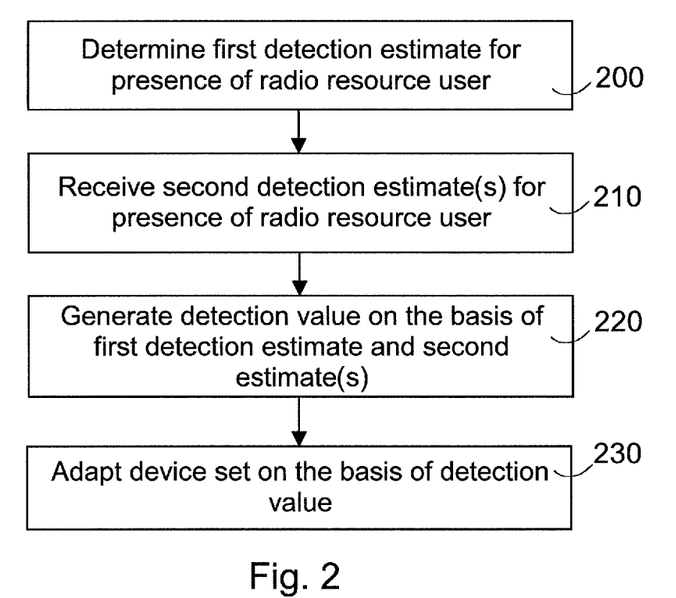
FIG. 2 is a flow diagram illustrating operations for device set selection according to an embodiment.

At least the CR device 100 is arranged to apply a specific procedure or algorithm to select radio devices in the device set 120, 130. FIG. 2 illustrates a method, in which a first detection estimate for the presence of a primary radio resource user is determined 200 on the basis of spectrum sensing. This detection estimate may be generated on the basis of frequency sensing by the device 100 carrying out the method of FIG. 2. In another embodiment the first detection estimate is received from another CR device or generated based on information received from another CR device. Thus, the step of determining 200 the first detection estimate is to be understood broadly to encompass also the option of determining the detection estimate based on an earlier spectrum detection estimate. The term "detection estimate" refers generally to a sensing or detection result or estimate for the presence of a primary user on the basis of spectrum sensing.

At least one other, herein referred to as second detection estimate for the presence of the primary user is received 210 from a device set 120, 130 of one or more CR devices 102 to 110. Thus, the CR device 100 may be arranged to receive second detection estimate(s) from at least one CR device in the current device set before configuring the device set. A detection value is generated 220 on the basis of the first detection estimate and the at least one other detection estimate. The device set is adapted 230 on the basis of the detection value. Step 230 may be carried out before or after deciding on use of a given radio resource on the basis of the detection estimates.

The detection value may be generated based on the detection estimates and their properties by various methods, some examples being further illustrated below. Also the device set may be adapted in various ways: In a simple example, the detection value may be compared to at least one threshold value, and a device may be added in the device list in response to the detection value not exceeding the threshold value.

By the present dynamically updated device set it becomes possible to optimize the number of messages used for cooperative spectrum sensing. The quality of the detection estimates may be continuously estimated and the number of devices in the set may be modified in accordance with the estimated quality. Thus, it becomes possible to reduce the amount of processing required in the device receiving the detection estimates. Further, if sensing results are requested, the CR device 100 may request and receive detection estimate messages only from devices in the device list 120, 130. Thus, the amount of signaling may be reduced.

Figure 3:
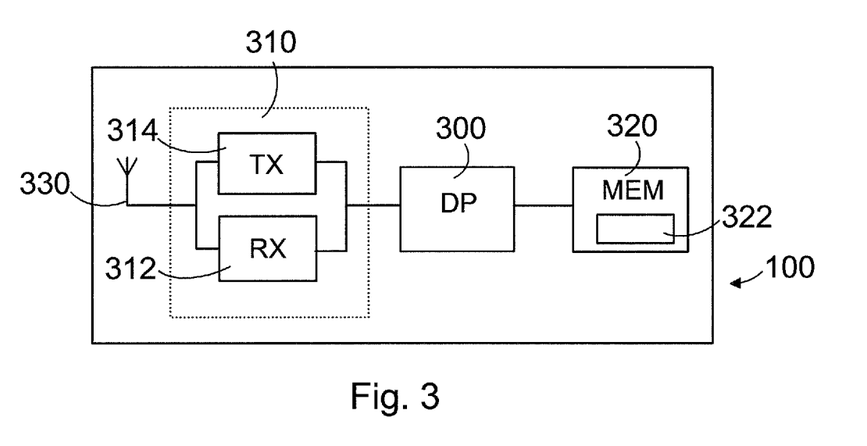
FIG. 3 is a simplified block diagram illustrating units of a cognitive radio apparatus according to an embodiment.

FIG. 3 is a simplified block diagram of high-level elements of an apparatus according to an embodiment. The apparatus comprises a data processing element DP 300 with at least one data processor, at least one radio frequency transceiver 310 with a transmitter 314 and a receiver 312 coupled to an antenna 330, and a memory 320 storing a program 322.

The memory 320 may be of any type suitable to the technical implementation context of the cognitive radio device and may be implemented using any suitable data storage technology. The data processing element 300 may be of any type suitable to the local technical environment, and may include one or more of general purpose computers, special purpose computers (such as an application-specific integrated circuit (ASIC) or a field programmable gate array FPGA), microprocessors, digital signal processors (DSPs) and processors based on a multi-core processor architecture, as non-limiting examples.

In general, various embodiments of the presently disclosed features may be implemented by computer software stored in a computer-readable medium, such as the memory 320 and executable by the data processing element 300 of the apparatus 100, or by hardware (such as an ASIC), or by a combination of software and/or firmware and hardware in the apparatus 100.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

The program 322 may comprise computer program instructions that, when executed by a data processor 300, enable the cognitive radio terminal 10 to operate in accordance with at least some of embodiments of the present invention. The program may comprise computer program code configured to, with the at least one processor, cause the apparatus to perform at least some of the features illustrated in connection with FIGS. 2 and 4 to 11*b*.

The apparatus could be in a form of a chip unit or some other kind of hardware module for controlling a cognitive radio device. The hardware module may form part of the device and could be removable. Some examples of such hardware module include a sub-assembly or an accessory device.

For instance, the cognitive radio device 100 of FIG. 1 may comprise the elements of FIG. 3. It will be appreciated that the apparatus may comprise various further elements not discussed in detail herein.

Although the apparatus and the data processing element 300 are depicted as a single entity, different features may be implemented in one or more physical or logical entities. For instance, the apparatus may comprise a sensor or detector configured to determine 200 the first detection estimate, a receiver configured to receive 210 the second estimate(s), one or more algorithms or generators configured to generate the detection value, and an adapter configured to adapt 230 the device set. There may be further specific functional module(s), for instance for carrying one or more of the steps in FIGS. 4 to 6. It is to be noted that the device set adaptation may be an independent procedure and controlled or carried out as part of an overall procedure and a spectrum sensing controller deciding on the use of a given radio resource and controlling the transceiver accordingly.

In general, the various embodiments of the apparatus and the cognitive radio device 100 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, as well as portable units or terminals that incorporate combinations of such functions and sensor networks.

The CR devices 100 to 110 may be arranged to use licensed and/or unlicensed bands. It should be appreciated that the embodiments related to device set selection may be applied in any current or future standard or non-standard radio system that supports cognitive radios and/or comprises a plurality of cognitive radios. As non-limiting examples, aspects of the exemplary embodiments of the invention may be implemented in a wireless local area network (WLAN), code division multiple access (CDMA), orthogonal frequency-division multiple access (OFDMA), UMTS terrestrial radio access network (UTRAN) or evolved UTRAN (E-UTRAN) based wireless communication system. The CR devices 100 to 110 may be arranged to support one or more CR technologies to communicate detection estimates with each other. For instance, the CR device 100 may be arranged to support at least one of IEEE 802.15 specification describing a system using unlicensed bands, the IEEE 802.22 working group developing a standard for a system operating on unused television channels and Third Generation Partnership Project (3GPP) long term evolution (LTE) cognitive radio features.

Let us now study some further detailed embodiments related to arranging the adaptation of the device set.

Figure 4:
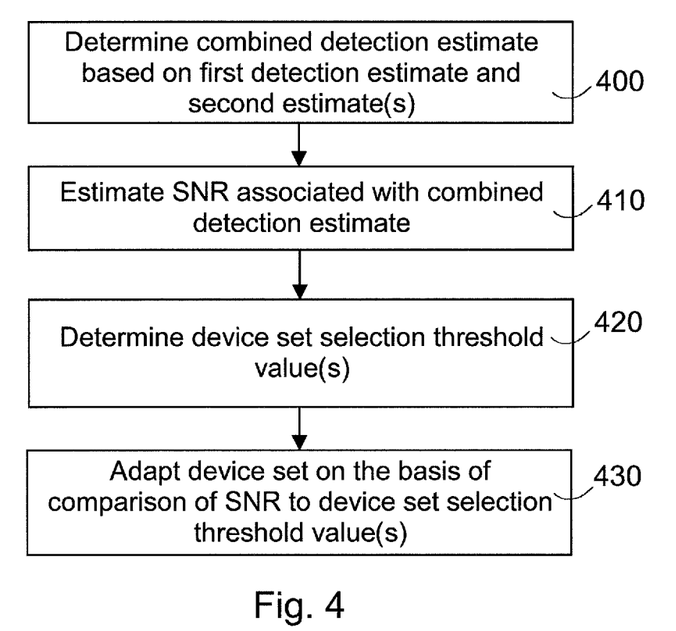
FIG. 4 is a flow diagram illustrating a method for arranging the detection value generation according to an embodiment.

In some embodiments the detection value is generated 220 on the basis of a signal to noise ratio (SNR) associated with the detection estimates. FIG. 4 illustrates a method for arranging the detection value generation (220) and device set modification (230) according to an embodiment. In step 400 a combined detection estimate c is generated on the basis of combining the first and second estimate(s). An SNR associated with the combined estimate c is estimated 410, and this value may serve as the detection value of FIG. 2.

In step 420 one or more device set selection threshold values are obtained. The device set selection threshold value(s) may be predefined e.g. in the memory 220 or dynamically determined on the basis of most recent radio resource usage decisions. Thus, the CR device 100 may be arranged to maintain history data of a predetermined number of such preceding decisions. The device set is adapted 430 based on the comparison of the SNR to the device set selection threshold value(s).

There are many alternative options available on applying SNR associated with detection estimates for arranging the device set selection. In one embodiment the SNR may provide an expected value for the ratio between the combined detection estimate c in the presence and absence of a primary signal from a primary user. The SNR may be estimated in step 410 by determining a measure of average power of the combined detection estimate c that is not attributed to a known detection instant of a signal, and relating a known magnitude of a detected signal feature in the detection estimate c to the measured noise power. It will be appreciated that instead of estimating the SNR on the basis of the combined detection estimate c, the SNR could be estimated solely based on the second detection estimate(s).

Instead and/or in addition to applying SNR, another method and other information associated with the detection estimates may be applied for generating 220 the detection value used for adapting 230 the device set. In some embodiments, the detection value is generated 220 by counting the number of detection estimates that exceed a predetermined threshold. In one embodiment, detection estimates are quantized to one bit, where a "1" bit indicates that a primary user is detected. The detection value may generated by calculating the percentage of "1" bits in a list of detection estimates. The list of detection estimates may comprise determined detection estimates, received detection estimates, or a combination thereof. For example, a list of detection estimates $L_D = \{0, 0, 1, 0, 0, 0, 1, 0, 1, 1\}$ may result in a detection value of 30%. However, these represent only some examples of available methods for generating the detection value(s) on the basis of the sensing results for device set adaptation.

Figure 5:
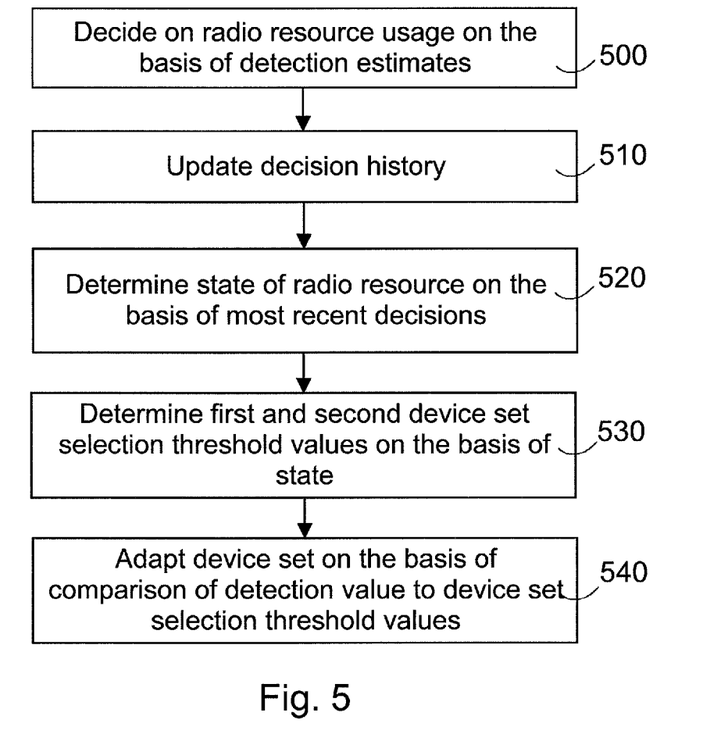
FIG. 5 is a flow diagram illustrating a method according to a further embodiment.

FIG. 5 illustrates an embodiment related to determining threshold values for the device set adaptation 230, 430. In step 500 a decision is made regarding the radio resource usage on the basis of the first detection estimate and the second detection estimate(s). Thus, radio transmission in the frequency and/or time domain being assessed is either enabled or disabled.

The decision step 500 may be entered after step 210 or 220 and may involve one or more processing steps for the detection estimates. For instance, the decision 500 may be based on generating a combined detection estimate c of the first detection estimate and the second detection estimate(s) and comparing the combined detection estimate or a further value based on the combined detection estimate to at least one dynamically created detection threshold value. The detection threshold value(s) may be based on the first detection estimate and/or the received second detection estimate(s). A result value, denoted herein as r, may be generated on the basis of the comparison to reflect the decision. For instance, r may indicate that the radio resource is free, busy or tentative. In one embodiment the detection threshold value(s) are determined on the basis of SNR of the combined detection estimate.

History data regarding radio resource usage is updated 510 based on the decision 500. For instance, the CR device 100 may be adapted to maintain information on three to fifteen most recent decisions. In a further example the radio device is arranged to maintain a history list truncated to five most recent decisions. In one embodiment the CR device 100 is arranged to store the result value r in the history data.

A state indicative of expected radio resource usage may be determined 520 for the radio resource on the basis of at least part of the decision history data. There may be two or more values for the state. For instance, the state may indicate that signal is expected, signal is not expected, or that the state is unclear or cannot be determined.

In one embodiment the state is determined 520 on the basis of the result value r. For instance, the state may be determined on the basis of a number of busy or free conditions in the history data, i.e. how many times the radio resource has recently been detected as occupied or free (of a primary user).

At least one device set selection threshold value for the device set adaptation is generated 530 based on the state. The device set is adapted 540 based on the comparison of the detection value to the dynamically generated device set threshold value(s). This embodiment enables to instantly adapt the threshold values and the device set in view of the dynamically changing radio environment.

As illustrated in FIG. 5, there may be two or more device set selection threshold values. For instance, the first value may be a minimum value, and a further CR device 102 to 110 is added to the device set 120, 130 in response to the detection value, such as the SNR, not exceeding this minimum value.

The second value may be a maximum value, and a CR device may be removed from the device set 120, 130 in response to this maximum value being exceeded.

In one embodiment, the device set selection threshold values are determined also on the basis of the size of the list $L_D$. The detection value is compared 430 to the threshold value(s) determined in step 420. However, it will be appreciated that also other methods may be applied to define the device set selection threshold values applied for adapting 230 the device set.

In the following, a further detailed example of device set adaptation is provided with reference to FIG. 6.

In step 600 a device set S of CR devices, history list and state are initialized.

Spectrum sensing is performed 602 with a sensor of the apparatus performing the present method, and a (first) detection estimate or metric $d_0$ is determined.

Figure 7:
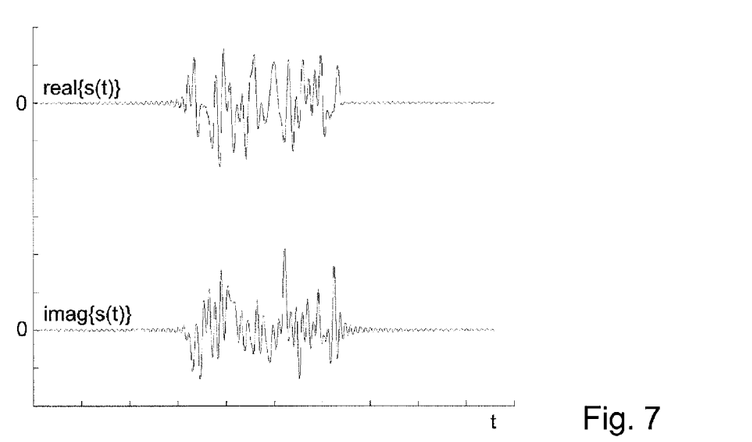
FIG. 7 provides an example of a baseband representation of a known signal feature.
Figure 8:
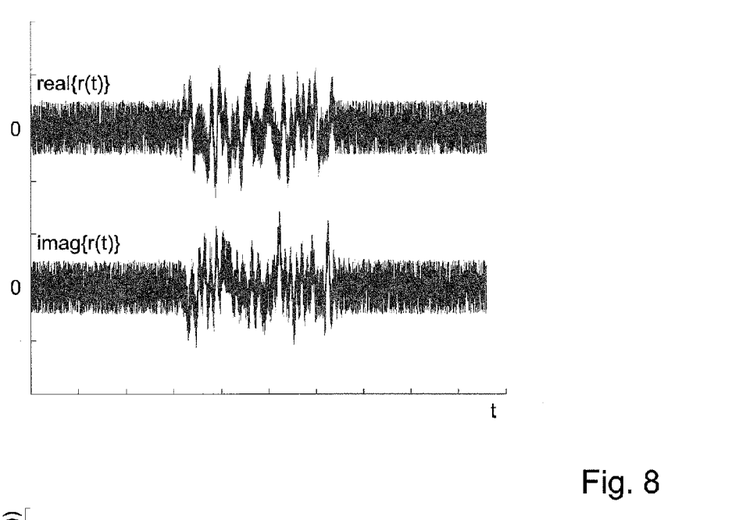
FIG. 8 provides an example of a baseband representation of a received signal.
Figure 9:
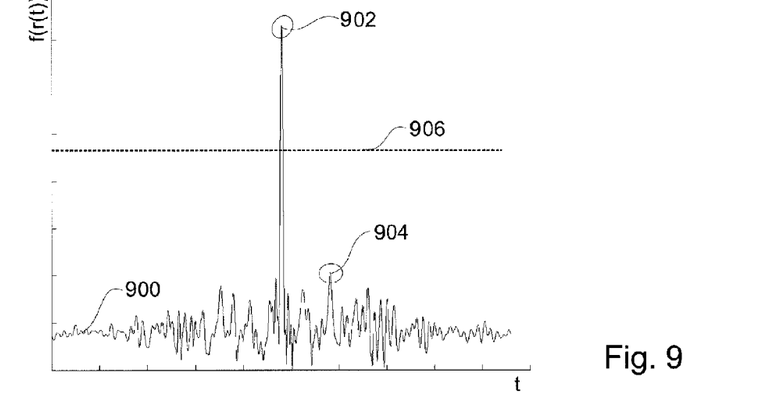
FIG. 9 illustrates output waveform 900 of an example matched filter.

Let us now further study how the detection estimates may be generated 200, 602 by additionally referring to FIGS. 7, 8, and 9. Let us assume that the CR device 100 intends to determine the absence or presence of primary user(s) in the frequency band f. The CR device 100 receives a signal in the frequency band f for primary user detection.

FIG. 7 provides an example of a baseband representation of a known signal feature, the absence or presence of which the radio device 100 is attempting to detect. FIG. 8 provides an example of a baseband representation of a received signal, including the known signal feature illustrated in FIG. 7 and noise.

The radio device 100 may apply a test statistic, for example a filter on the received signal and determine the average power of the filtered signal. FIG. 9 illustrates output waveform 900 of an example matched filter. The matched filter may be applied for processing the received signal of FIG. 8 and is matched to the waveform of FIG. 7. The first peak 902 in the matched filter output is caused by the presence of the signal feature. The second peak 904 is caused by noise in the received signal. A detector, such as a Neyman-Pearson type of detector, may compare the magnitude of a peak against a threshold 906 and thereby decide whether or not the signal feature has been detected. However, it is to be noted that other types of test statistics may be applied. For instance, instead of a matched filter cyclic prefix detection may be applied.

For the example in FIG. 9, the first peak 902 exceeds the threshold 906, while the second peak 904 remains below the threshold. Therefore, the detector gives the correct detection result "feature detected" at the time of peak 902, and "feature not detected" at the time of peak 904. Typically it is not possible to decide with certainty: Noise may reduce the magnitude of peak 902 below the threshold 906, and the detector may miss the presence of the signal feature. Further, noise may increase the magnitude of peak 904 above the threshold, resulting in a false alarm. A missed detection is highly undesirable in a cognitive radio application, since it will erroneously allow the cognitive radio to reuse a radio channel, causing interference to primary users. By applying the present features on optimally selected set of cognitive radio devices co-operatively sensing the spectrum, the detection performance can be substantially improved.

Alternatively, the CR device 100 may perform cyclic prefix detection or some other type of signal feature detection, resulting in the detection estimate. It will be appreciated that application of the present features is not limited to use of any particular radio resource user presence detection methods. For further information on some available techniques on co-operative spectrum hole recognition, reference is made e.g. to IEEE document "*What is a spectrum hole and what does it take to recognize one*", Rahul Tandra, Shirdhar Mubaraq Mishra, Anant Sahai, Volume 97, Issue 5, May 2009 Page(s): 824-848, 10.1109/JPROC.2009.2015710.

Returning to FIG. 6, detection estimates, which may be denoted as $d_1 \ldots d_N$, are received 604 from all CR devices in the set S. If the set is empty, no detection estimates are received.

At least some of the CR devices 100 to 110 may apply the above illustrated detection features or another detection method to generate detection estimates, which may then be sent to some or all nearby CR devices. For instance, the detection estimates may be broadcasted to and from the CR device 100 in a beacon channel, on an arbitrary frequency band, which is different from f.

Figure 10A:
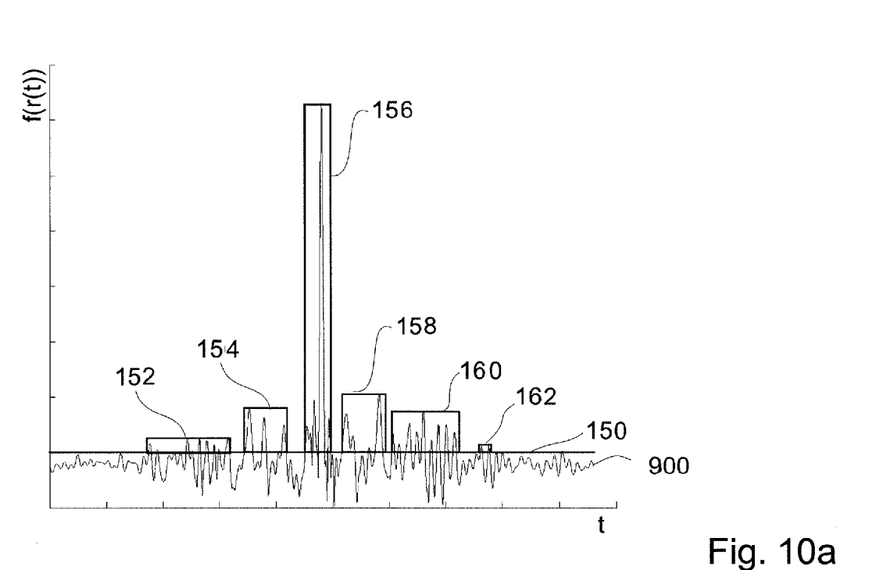
FIG. 10a illustrates an example of encoding a detection estimate.

FIG. 10a illustrates an example of encoding a detection estimate, indicating the detection result of FIG. 8. The detection estimate of FIG. 10a may comprise: a baseline 150 and a number of bounding boxes 152, 154, 156, 158, 160, 162. Each bounding box may be described by: a starting time, a duration, and a magnitude. The value(s) in the detection result messages may be quantized. The values may be quantized to two or more values. In a simple example, the value may be quantized to a single "yes" or "no" bit representation.

The radio device 100 may receive one or more such detection estimates in step 210 and 604. Initially, the radio device 100 may cooperate only with a single nearby cognitive radio device 102 to 110, denoted as N2. Thus, the "set of nodes" S equals {N2}. The radio device 100 may thus listen to broadcast transmissions by the N2. From a received message, the radio device 100 decodes the detection estimate of node N2, for instance a quantized detection value. The CR device 100 may determine an upper bound 950 illustrated in FIG. 10b for each received detection estimate.

Returning again to FIG. 6, the received detection estimates $d_1 \ldots d_N$ and the detection estimate $d_0$ are combined 606 into a combined detection estimate c. In one embodiment the CR device 100 determines the combined detection estimate c in step 400, 606 by averaging the upper bounds of received detection estimates and its own (first) detection estimate over time, and then selects the maximum value.

Figure 10B:
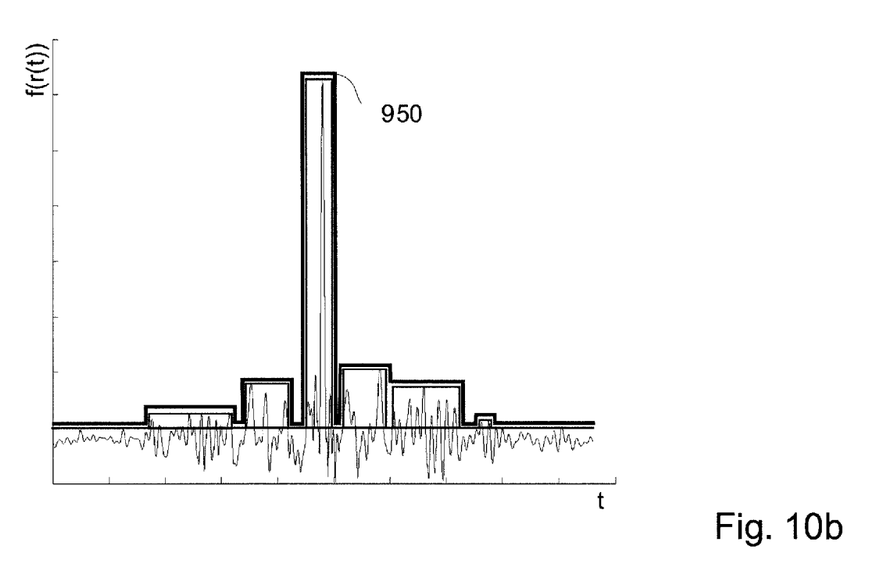
FIG. 10b illustrates how an upper bound may be defined for a detection estimate.

A signal-to-noise ratio SNR of the combined detection estimate c is estimated 608. For instance, an average of the combined detection estimate may be determined by summing up a measure of power of the detection estimate over a predetermined integration time excluding time instants containing known signal feature 156, and dividing the sum by the integration time. The combined detection estimate may be represented as an upper bound of bounding boxes, as illustrated in FIG. 10b. A predetermined magnitude of the known signal feature at the detection threshold is divided by the determined average. The average equals a measure of unwanted signal power (noise) N and the known magnitude equals a measure of wanted signal power (signal) S. Thus, the signal-to-noise ratio (SNR) may be obtained by dividing S by N.

Figure 11A:
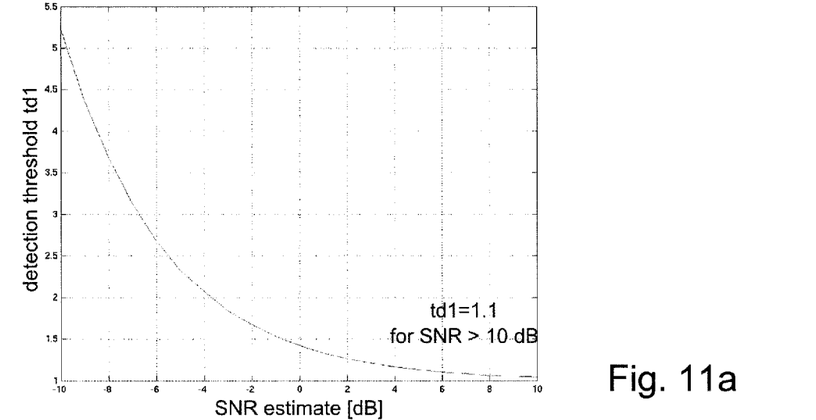
FIGS. 11a and 11b illustrate how detection thresholds may be determined.
Figure 11B:
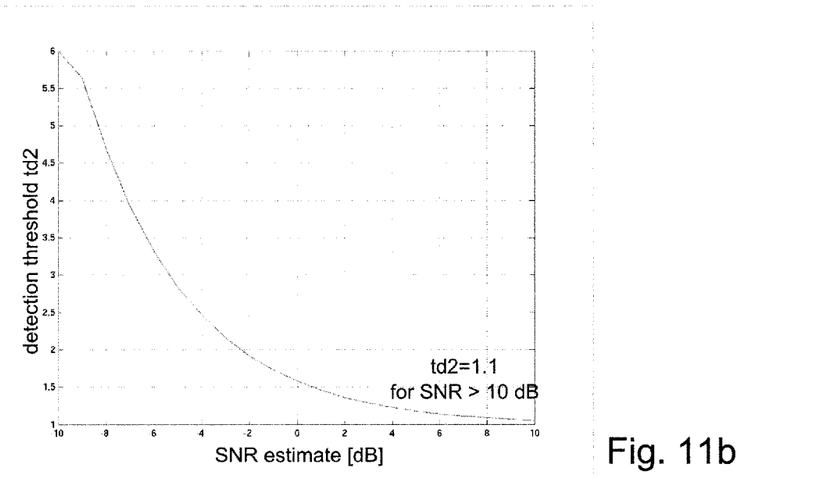

Detection thresholds $td_1$ and $td_2$ are determined 610 based on the SNR. FIGS. 11a and 11b illustrate how the thresholds $td_1$ and $td_2$, respectively, could be determined as a function of SNR. For instance, the threshold $td_1$ results in 95% detection probability and the threshold $td_2$ results in 80% detection probability.

The combined detection estimate c is compared 612 to the detection thresholds $td_1$ and $td_2$.

If the combined detection estimate c is below 614a the (stricter) first detection threshold $td_1$, the channel may be found to be free e.g. with 95% reliability. The detection result is set to "free", and transmission is enabled in 616a.

If the combined detection estimate c is between 614b thresholds $td_1$ and $td_2$, the channel may be found to be free with 80% reliability. The detection result is set to "tentative", and transmission is disabled in 616b.

If the combined detection estimate c exceeds 614c the second threshold $td_2$. The channel is quite certainly busy. The detection result is set to "busy", and transmission is disabled in 616b.

The detection result r is inserted 618 into the history list. The history list may be truncated in step 618. For instance, five most recent entries are maintained.

The number of "busy" results in the history list is counted 620, 622.

If the counted number of "busy" results is 0 or 1, the state is set 624a to "signal not expected". If the counted number of "busy" results is 4 or 5, the state is set 624b to "signal expected". Otherwise, the state is maintained unchanged.

The device set selection threshold values $SNR_{min}$ and $SNR_{max}$ are determined 626 on the basis of the state. For instance, the $SNR_{min}$ and $SNR_{max}$ may be determined on the basis of a look-up table. Table 1 provides an example of such look-up table.

TABLE 1

|  | state = "signal not expected" | state = "signal expected" |
| --- | --- | --- |
| $SNR_{min}$ | 2.3 dB | −4 dB |
| $SNR_{max}$ | 4.3 dB | −2.3 dB |

If the SNR estimate SNR is found to be below the $SNR_{min}$, an attempt is made to add 630a an additional cognitive radio device 102 to 110 to the set S. The addition attempt may fail, if no additional nodes are present. Adding nodes to set S may increase the future SNR, and thereby reduce the future false alarm ratio.

If the SNR estimate SNR is found to be above the $SNR_{max}$, an attempt is made to remove 630b a cognitive radio from the set S. The step may fail if the set S is already empty. Removing nodes from the set S may decrease the future SNR and thereby increase the future false alarm ratio, but reduce power consumption and activity time of a receiver. In the embodiment of FIG. 6 the SNR estimate SNR used as the detection value. The detection value may provide an estimate for the reliability of the decision 614a/614c.

Thus, by suitably selected device set selection values based on the state, the power consumption of the CR device 100 may be reduced during periods when the sensed channel is sensed as busy, by removing the number of CR devices in the device set. On the other hand, the detector quality may be increased when the channel is detected as free.

The above illustrated features enable that the decision to add or remove CR device to or from the device set may be driven by an attempt to maintain a signal-to-noise ratio of the combined detection estimates in a predetermined window. The predetermined window may be selected 826 based on the past state.

Figure 6:
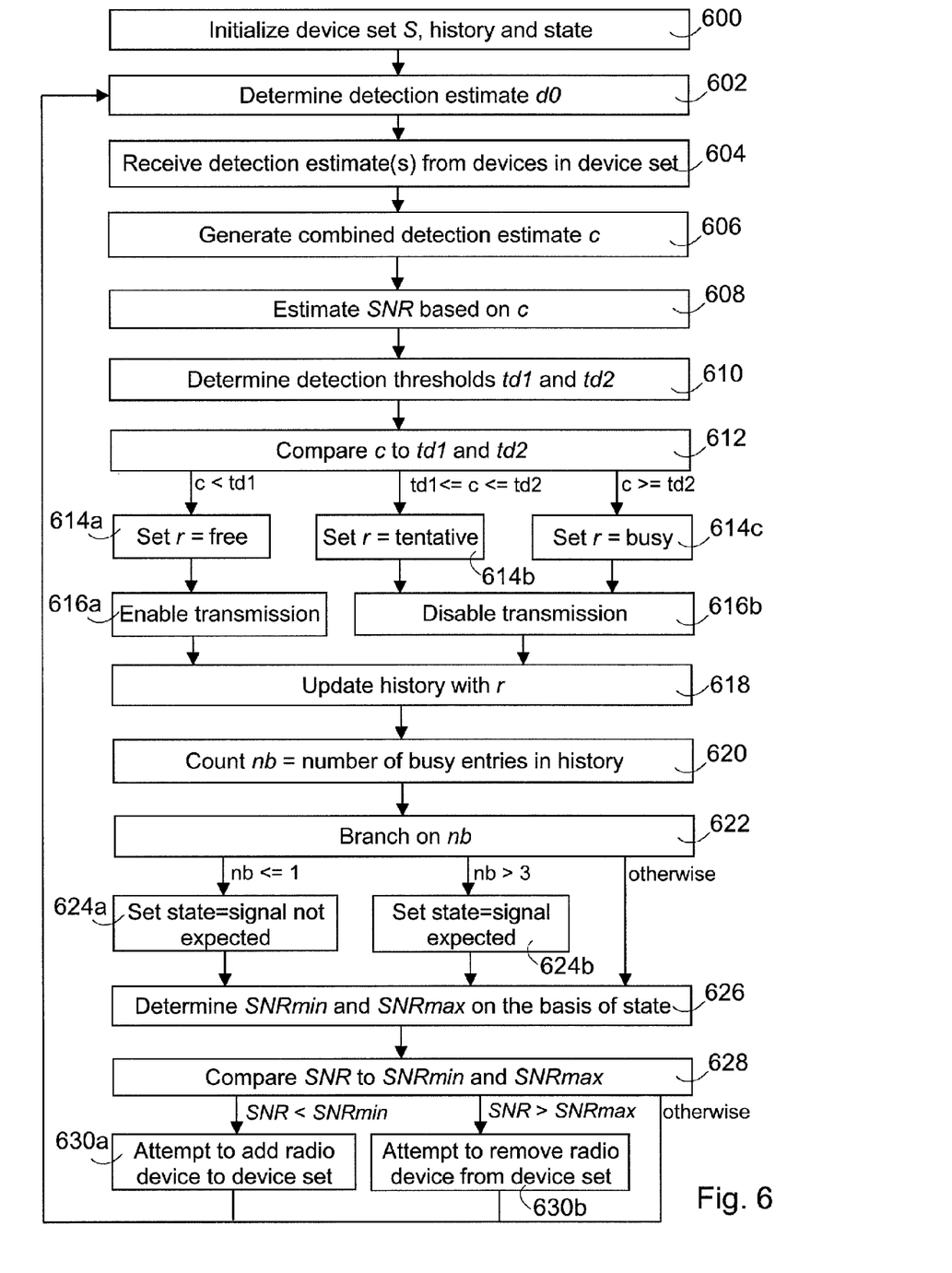
FIG. 6 is a flow diagram illustrating a method for determining threshold values for the device set adaptation according to an embodiment.

FIG. 6 illustrates a combination of embodiments related to determining the first detection estimate, generating the detection value based on the first detection estimate and the received detection estimate(s), dynamically generating the threshold values, and adapting the device set, as well as further embodiments. It is to be appreciated that some or all embodiments of FIG. 6 may be applied separately or in other combinations.

In some embodiments the decision 230 to adapt the number of devices in the device set is based on a probability of false alarm associated with the combined detection estimates and/or a probability of detection associated with the combined detection estimates. Thus, the decision may be driven by an attempt to maintain a targeted detection probability and/or a targeted false alarm probability. The targeted detection and false alarm probabilities may be selected based on a past state of the sensed channel, for instance. In one example embodiment, the detection value is generated 220 by determining the percentage of detection estimates that indicate the absence of a primary user.

In some embodiments further properties associated with the received detection estimate messages and/or the CR device 100 to 110 transmitting the detection estimate messages are applied in the algorithm for adapting the device set. For instance, the CR device 100 may be arranged to implement the device set modification algorithm such that the step 230 of selecting additional nodes into the set may be based on at least one of a known transmission time of messages from a secondary CR device 102 to 110, a known transmission schedule of a CR device 102 to 110, and a known transmission schedule of a second secondary CR device that has a data link with the (first) node. Thus, the CR device 100 may select CR devices transmitting on a desirable time pattern into the device set. The CR device 100 may be arranged to prefer CR devices, whose regular beacon broadcasts fall into the same time slot and therefore reduce the required operation time of the receiver 312. For instance, when selecting a new device, a device that fits into a receiver operating schedule is selected so that it is not necessary to wake the receiver from a sleep mode for reception of the detection estimate. Beacons from two CR devices may be separate for example in frequency, or use orthogonal codes on the same frequency, as assigned by conventional beacon resource management.

If desired, at least some of the different functions discussed herein may be performed in a different order and/or concurrently with each other. For instance, the reception of the other detection estimate(s) (step 210 in FIG. 2) may precede the determination of the first detection estimate (step 200). Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
    determining, by a first radio device of a device set of radio devices, a first detection estimate for a presence of a primary radio resource user based on spectrum sensing;
    receiving, from a second radio device of the device set, at least one other detection estimate for the presence of the primary radio resource user;
    generating a detection value based at least in part on the first detection estimate and the at least one other detection estimate; and
    removing a radio device from the device set based on the detection value being higher than a first threshold value.

2. The method of claim 1, further comprising:
generating, by the first radio device, a second detection estimate for the presence of the primary radio resource user;
receiving, from a third radio device of the device set, at least another detection estimate for the presence of the primary radio resource user;
generating another detection value based at least on the second detection estimate and the at least another detection estimate; and
adding a different radio device to the device set based on the another detection value being lower than a second threshold value different from the first threshold value.

3. The method of claim 2, wherein at least one of the first threshold value and the second threshold value is based on a state of a radio channel which has been sensed.

4. The method of claim 3, wherein the state of the radio channel is one of signal not expected and signal expected.

5. The method of claim 1, wherein at least one of the first detection estimate and the at least one other detection estimate comprises at least one quantized value.

6. The method of claim 5, wherein the at least one quantized value is based on one of an average power of a filtered waveform or a matched filter cyclic prefix detection.

7. The method of claim 1, wherein:
a combined detection estimate is generated based on the first detection estimate and the at least one other detection estimate;
the combined detection estimate is compared to second and third threshold values;
a decision on radio resource usage is made based at least in part on the first detection estimate and the at least one other detection estimate,
a state is determined for the radio resource based on decision history; and
at least one threshold value is generated based on the state.

8. The method of claim 1, wherein the detection value is an estimate for signal-to-noise ratio.

9. An apparatus, comprising:
at least one processor; and
at least one memory including computer program code,
the at least one memory and the computer program code configured to, with the at least one processor, cause the apparatus at least to perform:
determine a first detection estimate for a presence of a primary radio resource user based on spectrum sensing;
generate a detection value based at least in part on the first detection estimate and at least one other detection estimate for the presence of the primary radio resource user, wherein the at least one other detection estimate is received from a device set, wherein the device set is a set of one or more radio devices; and
remove a radio device from the device set based on the detection value being higher than a first threshold value.

10. The apparatus of claim 9, wherein the computer code is further configured to, with the at least one processor, cause the apparatus at least to perform:
add another radio device to the device set based on the detection value being lower than a second threshold value different from the first threshold value.

11. The apparatus of claim 10, wherein at least one of the first threshold value and the second threshold value is based on a state of a radio channel which has been sensed.

12. The apparatus of claim 11, wherein the state of the radio channel is one of signal not expected and signal expected.

13. The apparatus of claim 9, wherein at least one of the first detection estimate and the at least one other detection estimate comprises at least one quantized value.

14. The apparatus of claim 13, wherein the at least one quantized value is based on one of an average power of a filtered waveform or a matched filter cyclic prefix detection.

15. The apparatus of claim 9, wherein the computer code is configured to, with the at least one processor, cause the apparatus at least to perform:
generate a combined detection estimate based on the first detection estimate and the at least one other detection estimate;
compare the combined detection estimate to second and third threshold values;
decide on radio resource usage based on the first detection estimate and the at least one other detection estimate;
determine a state for the radio resource based on decision history; and
generate at least one threshold value based on the state.

16. The apparatus of claim 9, wherein the detection value is an estimate for signal-to-noise ratio.

17. The apparatus of claim 9, wherein the computer code is configured to, with the at least one processor, cause the apparatus to determine the first detection estimate by generating the first detection estimate based on radio measurements carried out by the apparatus or receiving the first detection estimate from a first device within the device set.

18. A non-transitory readable medium comprising one or more sequences of one or more instructions which, when executed by one or more processors of an apparatus, cause the apparatus to:
determine a first detection estimate for a presence of a primary radio resource user based on spectrum sensing;
generate a detection value based at least in part on the first detection estimate and at least one other detection estimate for the presence of the primary radio resource user, wherein the at least one other detection estimate is received from a device set, wherein the device set is a set of one or more radio devices; and
removing a radio device from the device set based on the detection value being higher than a threshold value.

* * * * *

UNITED STATES PATENT AND TRADEMARK OFFICE
CERTIFICATE OF CORRECTION

PATENT NO. : 9,148,791 B2  
APPLICATION NO. : 13/579308  
DATED : September 29, 2015  
INVENTOR(S) : Markus Nentwig Page 1 of 1

It is certified that error appears in the above-identified patent and that said Letters Patent is hereby corrected as shown below:

On the Title Page, Column 2, Item (56) References Cited, Other Publications  
        Please delete "Maiady" and replace with -- Malady --

Signed and Sealed this  
Third Day of May, 2016

Michelle K. Lee  
*Director of the United States Patent and Trademark Office*